(12) United States Patent
Iglesias

(10) Patent No.: US 12,197,994 B1
(45) Date of Patent: Jan. 14, 2025

(54) SECURE ALARM SYSTEM FOR SENSITIVE DEVICES

(71) Applicant: NXP B.V., Eindhoven (NL)

(72) Inventor: Jonathan Iglesias, Tlajomulco de Zuniga (MX)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/212,035

(22) Filed: Jun. 20, 2023

(51) Int. Cl.
*G06K 7/10* (2006.01)

(52) U.S. Cl.
CPC ..... *G06K 7/10405* (2013.01); *G06K 7/10297* (2013.01)

(58) Field of Classification Search
CPC .................. G06K 7/10405; G06K 7/10297
See application file for complete search history.

(56) References Cited

U.S. PATENT DOCUMENTS

| 2013/0257616 A1* | 10/2013 | Taylor ............... | G08B 21/0225 340/568.1 |
| 2022/0222726 A1* | 7/2022 | Rotstein ............. | G08B 13/246 |

FOREIGN PATENT DOCUMENTS

| CA | 2799170 | 6/2020 |
| CN | 102768790 | 11/2014 |
| CN | 212484446 U | 2/2021 |

* cited by examiner

*Primary Examiner* — Matthew Mikels

(57) ABSTRACT

A security platform includes a security tag having a wireless communication circuitry configured to receive a user identification (ID) from an ID tag. After receiving the user ID, the security tag tracks the distance the security tag moves away from a predetermined point. The security tag then compares the determined distance to a predetermined distance threshold to determine whether the security tag is within a range. In response to the determined distance being greater than the predetermined distance threshold, the security tag determines that the security tag is outside of the range and activates an alarm. The alarm of the security tag continues to be active until a second user ID having appropriate access rights is received.

20 Claims, 8 Drawing Sheets

SECURE ALARM SYSTEM FOR SENSITIVE DEVICES

BACKGROUND

Many organizations employ the use of sensitive devices that store or otherwise have access to confidential or proprietary information. Due to the value of these sensitive devices and the data they store, these sensitive devices become targets for theft and data leaks. As such, organizations typically store sensitive devices in secured and controlled environments. However, the sensitive devices are still vulnerable to being physically removed from these environments by unauthorized or malicious users, increasing the likelihood of confidential or proprietary information being leaked and negatively impacting the corporation.

BRIEF DESCRIPTION OF THE DRAWINGS

The present disclosure may be better understood, and its numerous features and advantages are made apparent to those skilled in the art, by referencing the accompanying drawings. The use of the same reference symbols in different drawings indicates similar or identical items.

DETAILED DESCRIPTION

Figure 1:
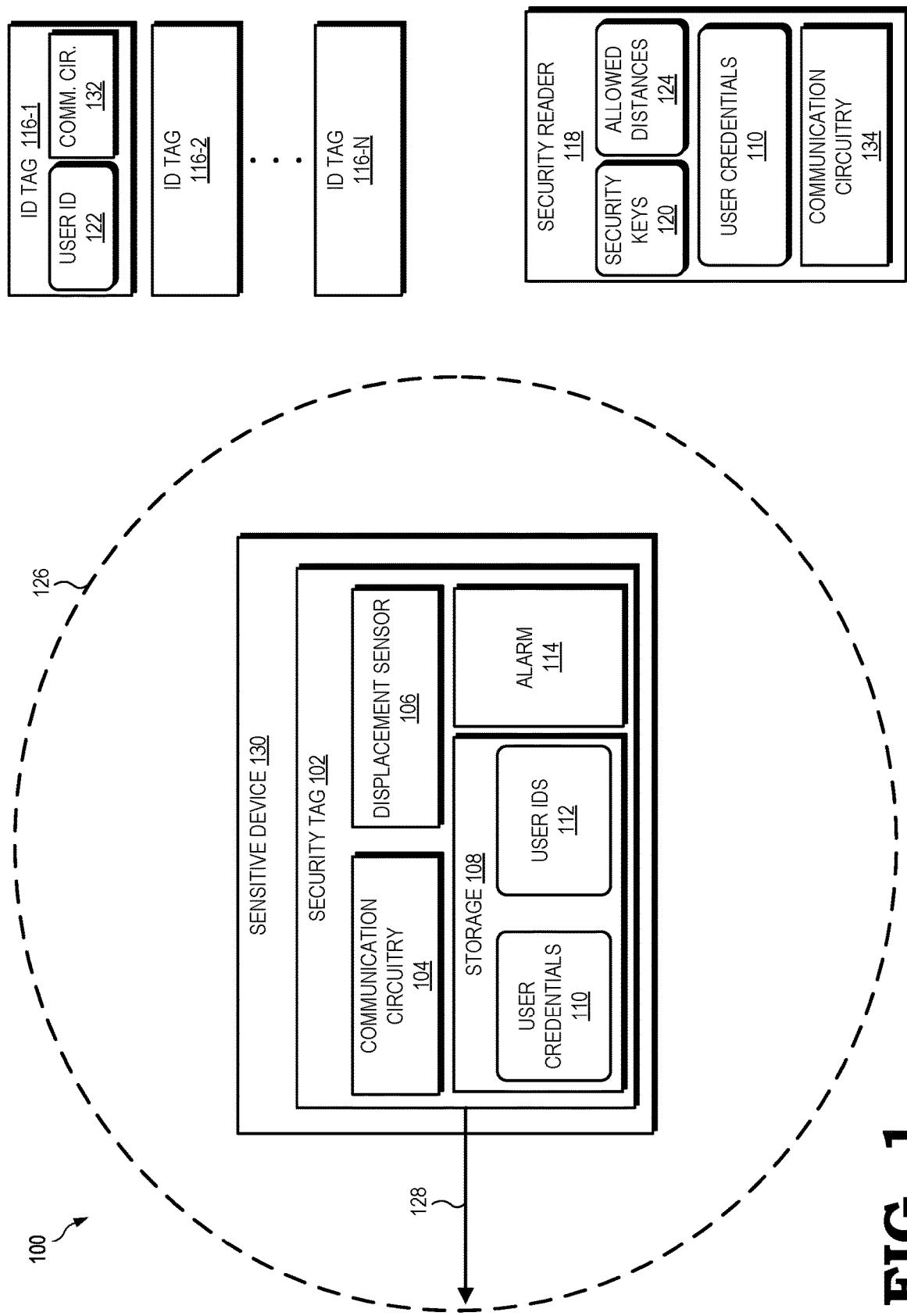
FIG. 1 is a block diagram of a security platform including a security tag for a sensitive device, in accordance with some embodiments.

To help prevent unauthorized access to certain environments (e.g., offices, buildings, laboratories, or warehouses), a conventional security platform typically is configured to only allow access to an environment for credentialed users. For example, some security platforms include one or more identification (ID) tags each storing a respective user identification (ID) for a corresponding user. A user ID stored on an ID tag includes data indicating a name, title, identification number, or any combination thereof of a corresponding user. Additionally, each ID tag includes wireless communication circuitry configured to wirelessly communicate with another device using one or more wireless protocols (e.g., Near Field Communication (NFC), Radio Frequency Identification (RFID), high-frequency RFID). The security platform further includes one or more security readers configured to control access to a respective environment based on a user ID received from an ID tag. For example, a security reader is configured to unlock an entryway (e.g., door) of a respective environment based on the user ID received from an ID tag. To this end, each security reader includes wireless communication circuitry configured to wirelessly communicate with another device (e.g., an ID tag) using one or more wireless protocols (e.g., NFC, RFID, high-frequency RFID). Further, each security reader includes or otherwise has access to user credentials for one or more respective users. For example, one or more security readers of a security platform are configured to access one or more databases storing user credentials for one or more respective users. As another example, one or more security readers of a security platform are configured to store user credentials for one or more respective users. The user credentials for a respective user include, for example, data indicating the identity of the user (e.g., user's name, user's title, user's identification number), access rights of the user (e.g., basic access, administrator access), certain environments the user is allowed to access, or any combination thereof.

To access an environment using these security platforms, an ID tag is configured to provide the user ID stored on the ID tag to a security reader using a wireless protocol. For example, the wireless communication circuitry of the ID tag is configured to provide the user ID stored on the ID tag to the communication circuitry of a security reader using NFC. In response to receiving the user ID, the security reader compares the user ID to one or more user credentials stored on or otherwise accessible to the security reader. Based on the comparison of the user ID to the user credentials, the security reader allows access to the environment by, for example, unlocking a door. As an example, the security reader compares the user ID to the user credentials to determine whether the user ID matches an identity of a user in the user credentials. If the user ID does not match an identity of a user in the user credentials, the security reader denies access to the environment and does not open the door. If the user ID does match the identity of a user in the user credentials, the security reader allows access based on the level of access for the user, certain environments the user is allowed to access, or both indicated in the user credentials.

However, while the security platform helps prevent unauthorized access to certain environments, the security platform is not configured to help prevent the removal of sensitive devices from the environments. A sensitive device, for example, includes a compute-enabled phone (i.e., smartphone), laptop computer, desktop computer, flash drive, hard drive, solid-state drive, circuit board, or the like that stores or is otherwise associated with sensitive data. As such, systems and techniques disclosed herein are directed to helping prevent the removal of sensitive devices from one or more environments. For example, a security platform includes one or more security tags each configured to be affixed to a respective sensitive device. Each security tag is configured to help ensure a sensitive device stays within a respective range and includes, for example, a wireless communication circuitry, displacement sensor, storage, and an alarm. To help ensure a sensitive device stays within a respective range, a security tag receives one or more user credentials and one or more allowed distances from a security reader. For example, the wireless communication circuitry of the security reader provides data indicating one or more user credentials and one or more allowed distances to the wireless communication circuitry of the security tag. After receiving the user credentials and allowed distances, the security tag then stores the received user credentials and allowed distances in the storage of the security tag. The stored user credentials include, for example, data indicating the identification of one or more respective users and the access rights of one or more respective users. These access rights, for example, indicate whether a user is authorized to activate a security tag, deactivate a security tag alarm, or both. Further, the stored allowed distances, for example, include data indicating respective maximum distances associated with one or more ranges.

After the user credentials and allowed distances are stored on the security tag, the security tag polls for one or more ID tags using one or more communication protocols. In response to detecting the presence of an ID tag, the security tag then requests and receives the user ID stored on the ID tag. The security tag compares the user ID to the user credentials stored on the security tag to determine if the user identified in the user ID has access rights to activate the security tag. In response to determining that the user identified in the user ID does not have access rights to activate the security tag, the security tag continues to poll for ID tags. In response to determining that the user identified in the user ID does have access rights to activate the security tag, the security tag stores the received user ID and requests a user ID from a second ID tag. For example, the communication circuitry of the security tag requests a second ID from a second ID tag using one or more communication protocols. The security tag then receives, via a communication protocol, a second user ID from a second ID tag and stores the received second user ID. Once the second user ID is stored, the security tag determines a distance threshold based on a stored allowed distance. The distance threshold, for example, represents a radius or another representation of a covered area from a predetermined point within which the security tag is allowed to move.

The security tag also includes a displacement sensor configured to determine the distance the security tag has moved away from a predetermined point. In response to the displacement sensor determining the security tag has moved a distance away from the predetermined point equal to or greater than the distance threshold, the security tag activates an alarm. In this way, the security tag helps ensure a sensitive device stays within a respective range by activating an alarm once the security tag affixed to a sensitive device moves a threshold distance away from a predetermined point. Because the security tag helps ensure a sensitive device stays within a respective range, the security tag also helps ensure that sensitive devices do not leave certain environments. Further, after the alarm of a security tag is activated, the security tag is configured to receive one or more user IDs from one or more ID tags via one or more communication protocols. After receiving a user ID when the alarm is activated, the security tag determines whether the user identified by the user ID has access rights to deactivate an alarm of a security tag. For example, the security tag determines whether the user credentials stored on the security tag indicate the user identified in the user ID is allowed to deactivate the alarm of the security tag. If the access rights of the user identified in the user ID indicate the user is allowed to deactivate the alarm, the security tag deactivates the alarm. In this way, only users with certain access rights are able to deactivate an alarm of a security tag, further helping ensure that sensitive devices do not leave certain environments.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions, or some combination thereof.

FIG. 1 illustrates a security platform 100 configured to secure a sensitive device within a specified environment, such as an office, building, laboratory, or warehouse. To this end, security platform 100 includes security tag 102 which includes communication circuitry 104, displacement sensor 106, storage 108, and alarm 114. In embodiments, security tag 102 is affixed to a sensitive device 130 via, for example, adhesive, screws, bolts, clamps, and the like. As an example, security tag 102 is affixed to a housing 131 of sensitive device 130. Sensitive device 130 includes, for example, a smartphone, laptop computer, flash drive, hard drive, solid-state drive, or any combination thereof which is configured to store or otherwise associated with sensitive data (e.g., confidential data, proprietary data). According to embodiments, security tag 102 is configured to help ensure sensitive device 130 stays within a range 126. Range 126 represents, for example, a threshold distance from a predetermined point. Within the example embodiment presented in FIG. 1, range 126 is represented as a circle having a radius corresponding to a threshold distance from the center of the circle representing range 126 (e.g., a predetermined point). However, it will be appreciated that as the environment in which the security platform 100 may impact the shape of the range 126. As such, in other implementations, the range 126 may have a non-circular, irregular shape. To help ensure sensitive device 130 stays within range 126, displacement sensor 106 of security tag 102 is configured to track the distance 128 security tag 102 has moved away from a predetermined point. For example, referring to the example embodiment presented in FIG. 1, displacement sensor 106 tracks the distance 128 security tag 102 has moved away from the center (e.g., a predetermined point) of the circle representing range 126. Displacement sensor 106 includes, for example, one or more accelerometers, time-of-flight (ToF) sensors, laser distance sensors, ultrasonic distance sensors, radar sensors, or any combination thereof. As an example, displacement sensor 106 includes an accelerometer configured to measure the acceleration of security tag 102 (e.g., the acceleration of the sensitive device 130 to which security tag 102 is affixed). Based on the measured acceleration, security tag 102, displacement sensor 106, or both determine a representation of the distance 128 security tag 102 has moved away from a predetermined point (e.g., the distance 128 the sensitive device 130 to which security tag 102 is affixed has moved away from the predetermined point). The representation of the distance 128, for example, includes a value that is derived from one or more measurements taken by displacement sensor 106 and that represents an approximation of the distance 128 security tag 102 has moved away from a predetermined point.

According to embodiments, security tag 102 is configured to compare the determined distance 128 (e.g., representation of the distance 128) security tag 102 has moved away from a predetermined point to a threshold distance to determine whether security tag 102 is within range 126. For example, security tag 102 is configured to determine whether the determined representation of distance 128 security tag 102 has moved away from a predetermined point is equal to or greater than a predetermined threshold distance associated with range 126 (e.g., a predetermined threshold distance representative of range 126). In response to the determined representation of distance 128 being less than the predetermined threshold distance associated with range 126, displacement sensor 106 continues to track the distance 128 security tag 102 has moved away from a predetermined point. In response to the representation of the determined distance 128 being equal to or greater than the predetermined threshold distance associated with range 126, security tag 102 is configured to activate alarm 114. Alarm 114, for example, includes one or more output devices (e.g., speakers, buzzers, lights, motors) configured to output an audio alarm (e.g., siren, buzzer, klaxon, beeps, chirps), a visual alarm (e.g., blinking lights, flashing lights, lights having one or more colors), a haptic alarm or any combination thereof. For example, in response to the determined distance 128 being equal to or greater than the predetermined threshold distance associated with range 126, security tag 102 is configured to activate alarm 114 including a speaker that outputs beeps, a siren, chirps, or any combination thereof. In this way, security tag 102 helps ensure a sensitive device 130 stays within an environment by activating alarm 114 (e.g., audio alarm, visual alarm, haptic alarm) when the sensitive device 130 moves outside range 126. As an example, in response to a user carrying a sensitive device 130 having security tag 102 affixed outside of range 126, alarm 114 will activate, helping prevent the user from removing the sensitive device 130 from the environment.

In embodiments, to further help ensure a sensitive device 130 remains within the specified environment, security tag 102 is configured to be implemented in a security platform 100 including one or more ID tags 116 and one or more security readers 118. Each ID tag 116, for example, includes circuitry to store a respective user ID 122 for a corresponding user (e.g., a user associated with the ID tag 116). Each user ID 122 includes data representing the name, title, identification number, or other identifier of a corresponding user, or any combination thereof. Further, each ID tag 116 includes communication circuitry 132 configured to communicatively couple to one or more other devices (e.g., security reader 118 or security tag 102) using one or more wireless communication protocols (e.g., NFC, RFID, high-frequency RFID). For example, an ID tag 116 includes a wireless communication circuitry (e.g., communication circuitry 132) configured to wirelessly communicatively couple to security reader 118, security tag 102, or both using NFC protocols. Though the example embodiment presented in FIG. 1 depicts security platform 100 as including three ID tags (116-1, 116-2, 116-N) representing an N number of ID tags (N>1), in other embodiments, security platform 100 can include any number of ID tags.

Security reader 118, for example, includes circuitry configured to control access to an environment (e.g., building, office, laboratory, warehouse). As an example, security reader 118 is configured to unlock a door or other entranceway of an environment. To this end, security reader 118 includes circuitry configured to store or otherwise access user credentials 110. For example, in embodiments, security reader 118 is configured to access one or more user credentials 110 for one or more respective users stored in one or more databases (not shown for clarity). User credentials 110 associated with a respective user include, for example, data indicating the identity of the user (e.g., user's name, user's title, user's identification number), access rights of the user (e.g., whether a user is allowed to activate a security tag 102, deactivate a security tag alarm, or both), certain environments the user is allowed to access, or any combination thereof. Further, according to some embodiments, security reader 118 also stores or is otherwise configured to access one or more allowed distances 124. An allowed distance 124, for example, includes data indicating a range 126 for one or more sensitive devices 130. In embodiments, each allowed distance 124 is associated with one or more users, types of sensitives devices, certain sensitive devices 130, access rights (e.g., basic access, administrator access), or any combination thereof.

Additionally, security reader 118 includes communication circuitry 134 configured to communicatively couple to one or more other devices (e.g., ID tag 116, security tag 102) using one or more wireless communication protocols. For example, security reader 118 includes a wireless communication circuitry (e.g., communication circuitry 134) configured to communicatively couple to security ID tag 116, security tag 102, or both using NFC. To allow access to an environment, security reader 118 initially receives, via communication circuitry 134, a user ID 122 from an ID tag 116. After receiving the user ID 122, security reader 118 compares the user ID 122 to one or more user credentials 110. For example, security reader 118 compares the user ID 122 to one or more user credentials 110 to determine whether the user ID 122 matches an identity of a user indicated in one or more user credentials 110. If the received user ID 122 does not match an identity of a user in the user credentials 110 (e.g., the user ID 122 is unknown to security reader 118), security reader 118 denies access to the environment. If the user ID 122 does match the identity of a user in the user credentials 110, security reader 118 allows access based on the level of access for the user, certain environments the user is allowed to access, or both indicated in the user credentials 110. In some embodiments, communication between security reader 118 and one or more ID tags 116 is encrypted. To this end, security reader 118 and one or more ID tags 116 are each configured to store one or more security keys 120. Security keys 120, for example, include cryptographic keys used to encrypt and decrypt data. For example, when transmitting data (e.g., user ID 122), an ID tag 116, security reader 118, or both are configured to first encrypt the data using one or more security keys 120. Likewise, an ID tag 116, security reader 118, or both are configured to first decrypt received data using one or more security keys 120.

According to embodiments, security tag 102 is configured to operate in two or more modes. For example, security tag 102 is configured to operate in a provision mode, usage mode, low power mode, active mode, or any combination thereof. While in a provision mode, security tag 102 is configured to accept and store data used to configure security tag 102. As an example, in some embodiments, while in a provision mode, security tag 102 is configured to request one or more user credentials 110, security keys 120, allowed distances 124, or any combination thereof from security reader 118. To request data from security reader 118, security tag 102 sends data indicating the request to security reader 118 using communication circuitry 104. Communication circuitry 104 is configured to communicatively couple to one or more other devices (e.g., ID tag 116, security reader 118) using one or more wireless communication protocols. For example, security tag 102 includes a wireless communication circuitry (e.g., communication circuitry 104) configured to communicatively couple to security ID tag 116, security reader 118, or both using NFC. In response to receiving a request for one or more user credentials 110, security keys 120, allowed distances 124, or any combination thereof from security tag 102, security reader 118 is configured to, via communication circuitry 134, send the requested user credentials 110, security keys 120, and allowed distances 124 to security tag 102. Security tag 102 then stores the requested user credentials 110, security keys 120, and allowed distances 124 in storage 108. Storage 108, for example, includes solid-state memory, flash memory, or both configured to store data. In embodiments, security tag 102 encrypts one or more user credentials 110 using one or more received security keys 120 before storing the user credentials 110 in storage 108.

After security tag 102 stores the requested user credentials 110, security keys 120, and allowed distances 124 in storage 108, security tag 102 enters a usage mode. While in a usage mode, security tag 102 polls for one or more ID tags 116. As an example, security tag 102 enters a low-power mode that continuously or periodically polls for one or more ID tags 116. In response to detecting an ID tag 116, security tag 102 requests the user ID 122 stored on the ID tag 116 and receives the user ID 122 using one or more wireless communication protocols. For example, communication circuitry 104 is configured to receive the user ID 122 using NFC communication protocols. Once the user ID 122 is received from the ID tag 116, security tag 102 stores the user ID 122 in storage 108 as user IDs 112. In embodiments, security tag 102 is configured to first decrypt the received user ID 122 using one or more security keys 120 in storage 108. Further, security tag 102 compares the user ID 122 to the user credentials 110 stored on the security tag 102 to determine whether the user identified by the user ID 122 has access rights to activate security tag 102. As an example, security tag 102 first determines whether the user credentials 110 stored on security tag 102 include data associated with the user identified in the received user ID 122. If the user credentials 110 do include data associated with the user identified in the received user ID 122, security tag 102 then determines the access rights of the user indicated in the user credentials 110 to determine whether the user identified by the received user ID 122 has access rights to activate security tag 102. In response to the user identified by the received user ID 122 not having access rights to activate security tag 102, security tag 102 continues to poll for one or more ID tags 116. In response to the user identified by the received user ID 122 having access rights to activate security tag 102, security tag 102 then requests a second user ID 122 from a second ID tag 116. For example, security tag 102, via communication circuitry 104, transmits a request for a user ID 122 to devices (e.g., ID tags 116) within the range of communication circuitry 104.

In response to receiving a second user ID 122 from a second ID tag 116, security tag 102 is configured to store the second user ID 122 in storage 108 as user IDs 112. According to embodiments, for example, security tag 102 is configured to first decrypt the second user ID 122 using one or more security keys 120 in storage 108 before storing the second user ID 122 in storage 108. Additionally, in response to receiving a second user ID 122 from a second ID tag 116, security tag 102 is configured to enter an active mode. While in an active mode, security tag 102 is configured to determine a range 126 based on one or more allowed distances 124 stored on security tag 102. As an example, based on a stored allowed distance 124, security tag 102 determines a distance threshold (e.g., maximum distance) away from a predetermined point that represents the range 126. According to embodiments, security tag 102 is configured to determine the range 126 based on an allowed distance 124 associated with a user identified in user IDs 112 (e.g., the user identified in the second user ID 122), a type of device of sensitive device 130, or both. After determining a range 126, displacement sensor 106 then tracks the distance 128 security tag 102 has moved away from a predetermined point and determines whether security tag 102, and by association, sensitive device 130, is still within the determined range 126. In response to security tag 102 leaving range 126, security tag 102 activates alarm 114. That is to say, in response to security tag 102 moving a distance 128 away from a predetermined point equal to or greater than a distance threshold associated with (e.g., representative of) a range 126, security tag 102 activates alarm 114.

To deactivate alarm 114, security tag 102 is configured to request a user ID 122 from one or more ID tags 116. For example, security tag 102, via communication circuitry 104, transmits a request for a user ID 122 to one or more devices (e.g., ID tags 116) within the range of communication circuitry 104. In response to receiving the user ID 122 while alarm 114 is active, security tag 102 compares the received user ID 122 to the user credentials 110 stored on the security tag 102 to determine whether the user identified by the user ID 122 has access rights to deactivate alarm 114. That is to say, security tag 102 determines whether the user ID 122 is authorized to deactivate the alarm. As an example, security tag 102 first determines whether the user credentials 110 stored on security tag 102 include data associated with the user identified in the received user ID 122. If the user credentials 110 do include data associated with the user identified in the received user ID 122, security tag 102 then determines the access rights of the user indicated in the user credentials 110 to determine whether the user identified by the received user ID 122 has access rights to deactivate alarm 114. In response to the user identified by the received user ID 122 not having access rights to deactivate alarm 114, alarm 114 continues to be active. In response to the user identified by the received user ID 122 having access rights to deactivate alarm 114 (e.g., in response to the user ID 122 being authorized to deactivate the alarm), security tag 102 deactivates alarm 114. In this way, alarm 114 is only deactivated by a user having the appropriate access rights (e.g., having an ID tag 116 with the correct access rights). Because alarm 114 is only deactivated by a user having the appropriate access rights, alarm 114 will continue to be active if an unauthorized user attempts to remove a sensitive device 130 with security tag 102 affixed from range 126, helping ensure the sensitive device 130 does not leave the range 126, an environment, or both.

Figure 2:
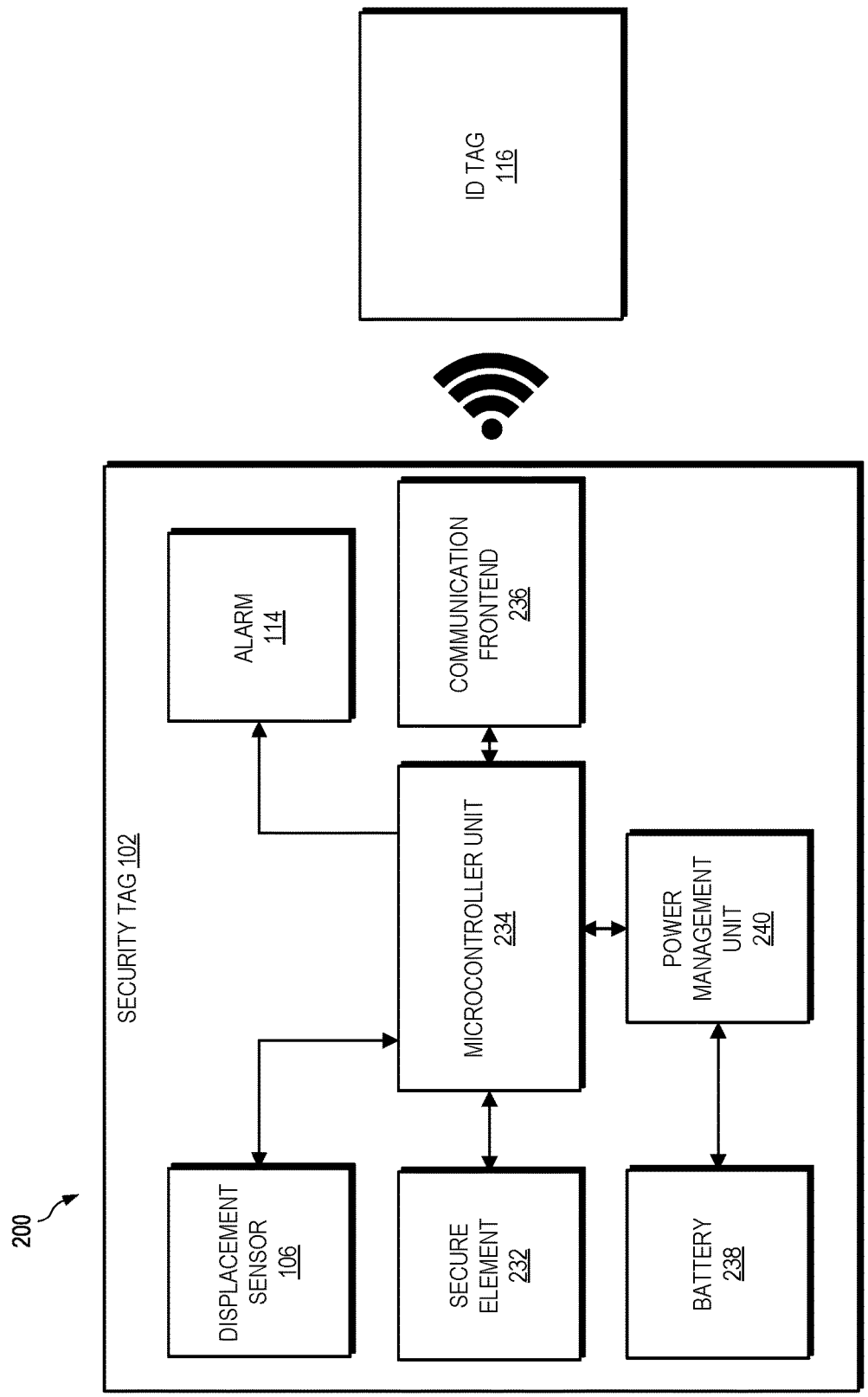
FIGS. 2, 3, 4, and 5 are block diagrams of respective example configurations for a security tag, in accordance with some embodiments.

FIGS. 2 to 5 each presents a corresponding example configuration for security tag 102. For example, FIGS. 2 to 5 each presents one or more components implemented as communication circuitry 104, displacement sensor 106, storage 108, alarm 114, or any combination thereof of security tag 102. Referring now to FIG. 2, an example configuration 200 for security tag 102 is presented. Within example configuration 200, security tag 102 includes displacement sensor 106, alarm 114, secure element 232, microcontroller unit 234, communication frontend 236, battery 238, power management unit 240, and storage 108. Microcontroller unit 234, for example, includes one or more processor cores, memories, or both configured to perform one or more instructions, operations, or both for security tag 102. In embodiments, microcontroller unit 234 is configured to receive and provide data to displacement sensor 106, alarm 114, secure element 232, communication frontend 236, power management unit 240, and storage 108. Secure element 232, for example, includes circuitry configured to encrypt, decrypt, and store data. For example, using one or more security keys 120, secure element 232 is configured to encrypt and store user credentials 110, security keys 120, allowed distances 124, user IDs 122, or any combination thereof received from security reader 118, one or more ID tags 116, or both. As another example, using one or more security keys 120, secure element 232 is configured to decrypt one or more received user IDs 122 received from one or more ID tags 116. In embodiments, for example, secure element 232 is implemented in security platform 100 as storage 108.

Communication frontend 236, for example, includes circuitry configured to poll for one or more devices (e.g., ID tags 116, security reader 118), transmit data to one or more devices, receive data from one or more devices, or any combination thereof using one or more wireless communication protocols. As an example, communication frontend 236 includes an NFC-compatible frontend configured to receive data from one or more ID tags 116, security reader 118, or both. According to embodiments, communication frontend 236 is implemented in security platform 100 as at least a portion of communication circuitry 104. Battery 238 provides power to components of the security tag 102. To control the voltage, current, or both of battery 238 provided to displacement sensor 106, alarm 114, secure element 232, microcontroller unit 234, communication frontend 236, or any combination thereof, security tag 102 includes power management unit 240. Power management unit 240 includes, for example, a microcontroller or other circuitry configured to control the voltage and current provided from battery 238 to one or more components of security tag 102 (e.g., displacement sensor 106, alarm 114, secure element 232, microcontroller unit 234, communication frontend 236). As an example, when security tag 102 is operating in a low-power mode, power management unit 240 is configured to control the voltage and current provided from battery 238 to one or more components of security tag 102 so as to reduce the amount of power consumed by the components and extend the battery life of battery 238.

Figure 3:
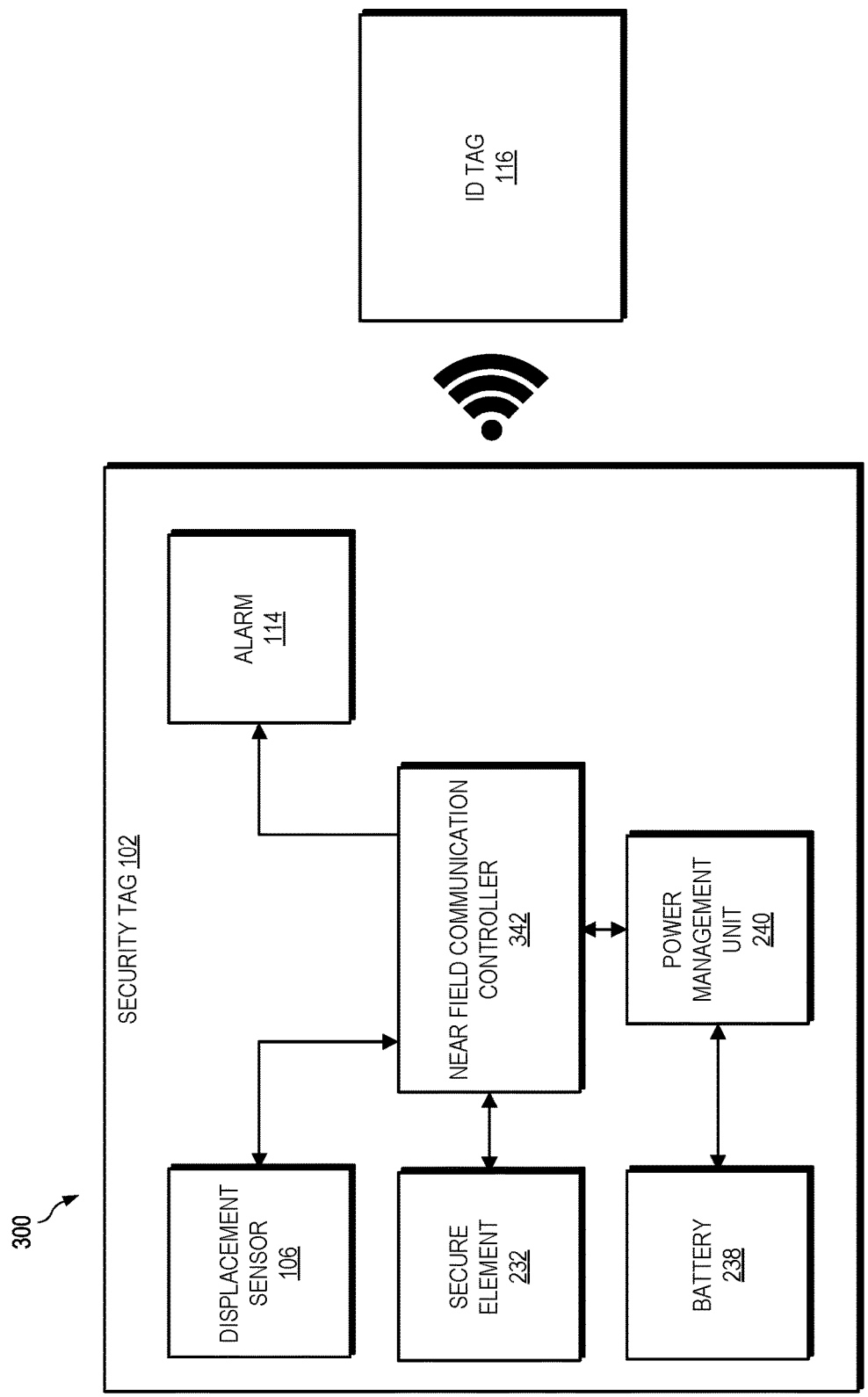

Referring now to FIG. 3, another example configuration 300 for security tag 102 is presented. Within example configuration 300, security tag 102 includes displacement sensor 106, alarm 114, secure element 232, NFC controller 342, battery 238, and power management unit 240. NFC controller 342, for example, includes one or more microcontrollers (e.g., microcontroller unit 234) and/or other circuitry configured to communicatively couple to one or more devices using wireless signaling compliant with NFC protocols. For example, NFC controller 342 is configured to receive one or more user credentials 110, security keys 120, allowed distances 124, and user IDs 122 from security reader 118, one or more ID tags 116, or both using NFC-based wireless signaling. In embodiments, at least a portion of NFC controller 342 is implemented in security platform 100 as communication circuitry 104.

Figure 4:
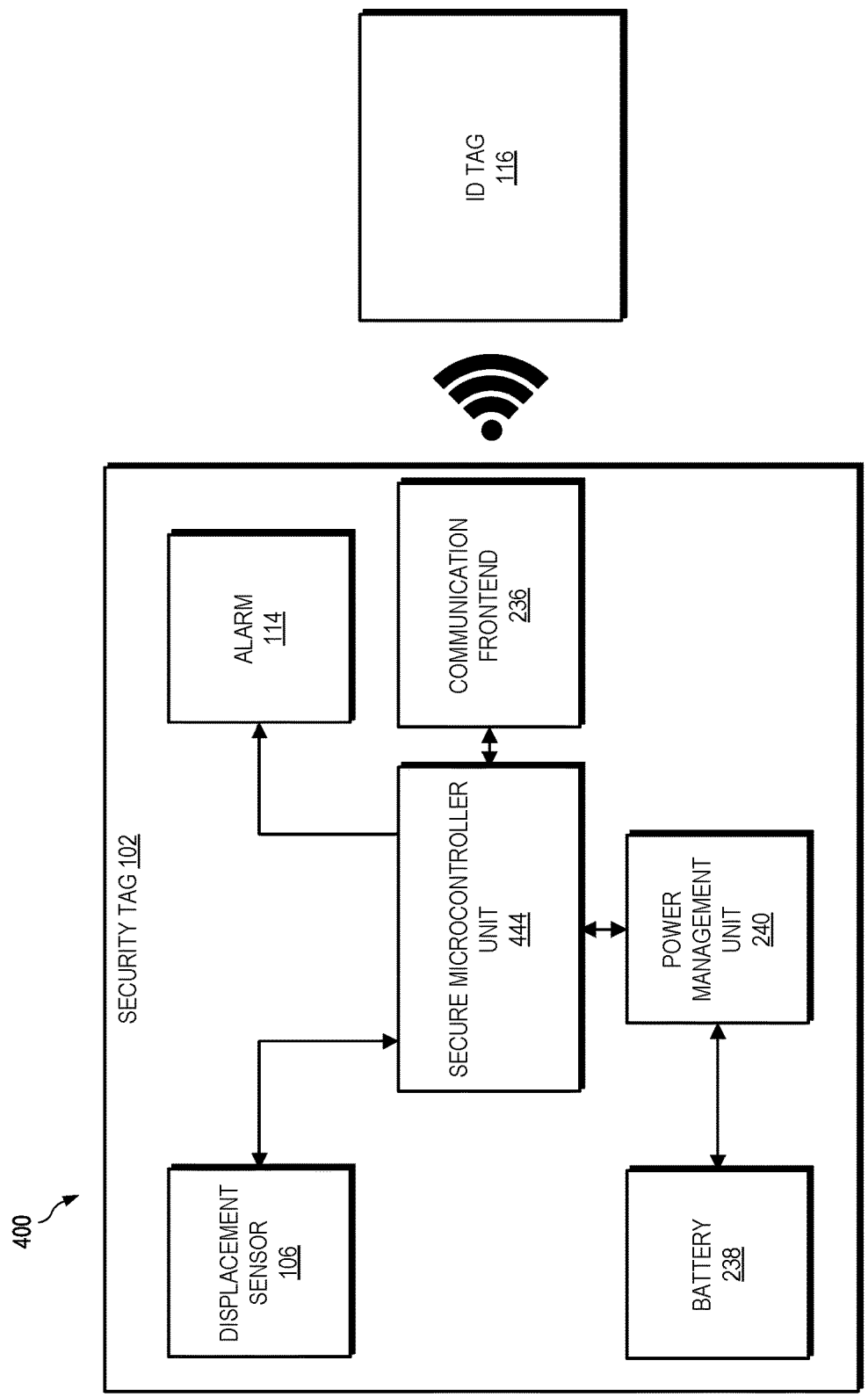

Referring now to FIG. 4, an example configuration 400 for security tag 102 is presented. Within example configuration 400, security tag 102 includes displacement sensor 106, alarm 114, secure microcontroller unit 444, communication frontend 236, battery 238, and power management unit 240. Secure microcontroller unit 444 includes, for example, one or more microcontrollers (e.g., microcontroller unit 234) and/or other circuitry configured to encrypt, decrypt, and store data. For example, using one or more security keys 120, secure microcontroller unit 444 is configured to encrypt and store user credentials 110, security keys 120, allowed distances 124, user IDs 122, or any combination thereof received from security reader 118, one or more ID tags 116, or both. As another example, using one or more security keys 120, secure microcontroller unit 444 is configured to decrypt one or more received user IDs 122 received from one or more ID tags 116. In embodiments, at least a portion of secure microcontroller unit 444 is implemented in security platform 100 as storage 108.

Figure 5:
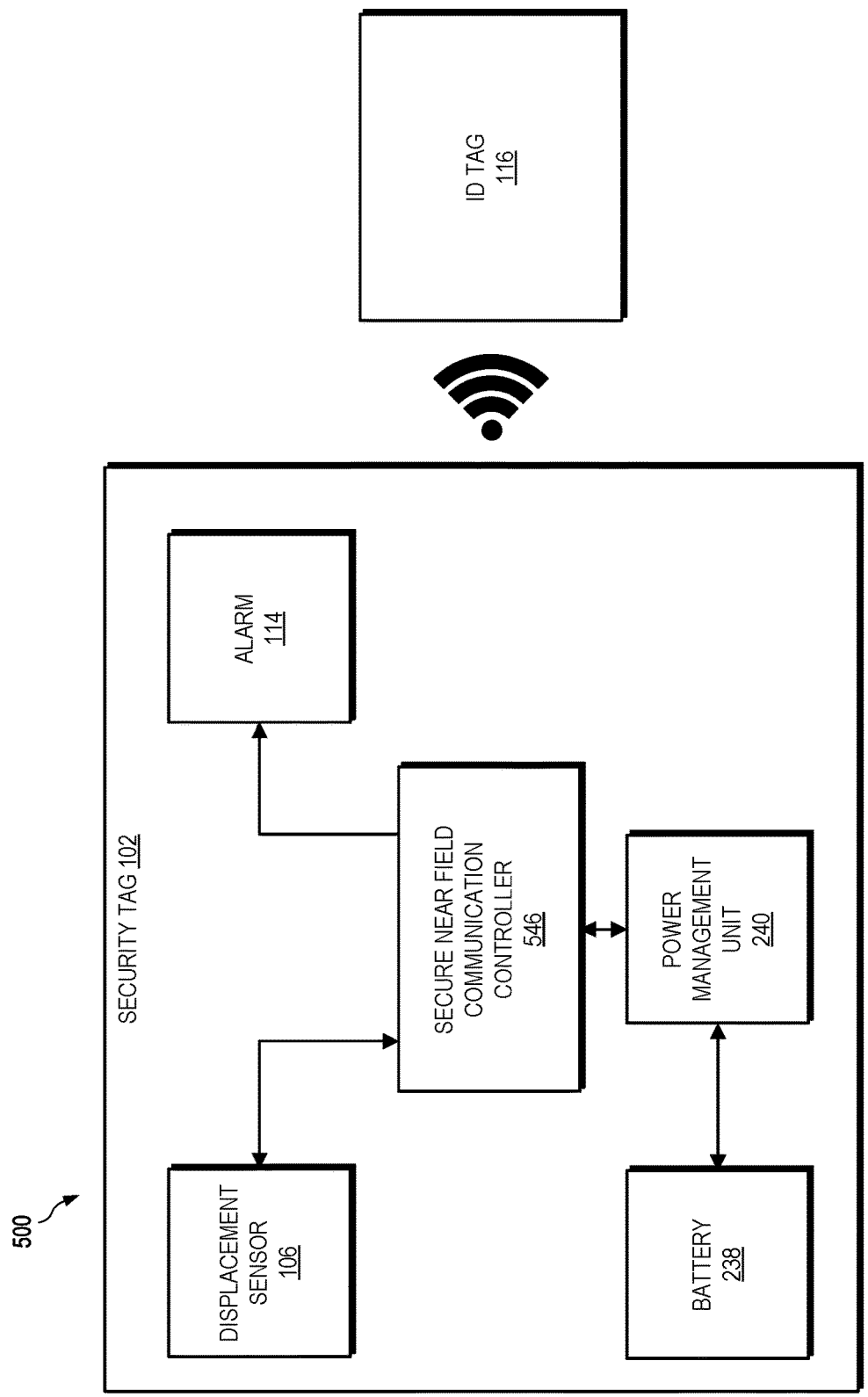

Referring now to FIG. 5, another example configuration 500 for security tag 102 is presented. Within example configuration 500, security tag 102 includes displacement sensor 106, alarm 114, secure near field communication controller (secure NFC controller) 546, battery 238, and power management unit 240. Secure NFC controller 546 includes one or more microcontrollers (e.g., microcontroller unit 234) and/or other circuitry configured to communicatively couple to one or more devices using NFC-based wireless signaling. For example, secure NFC controller 546 is configured to receive one or more user credentials 110, security keys 120, allowed distances 124, and user IDs 122 from security reader 118, one or more ID tags 116, or both using NFC-based wireless signaling. Further, secure NFC controller 546 includes circuitry configured to encrypt, decrypt, and store data. For example, using one or more security keys 120, secure NFC controller 546 is configured to encrypt and store user credentials 110, security keys 120, allowed distances 124, user IDs 122, or any combination thereof received from security reader 118, one or more ID tags 116, or both. In embodiments, one or more portions of secure NFC controller 546 are implemented in security platform 100 as communication circuitry 104 and storage 108.

Figure 6:
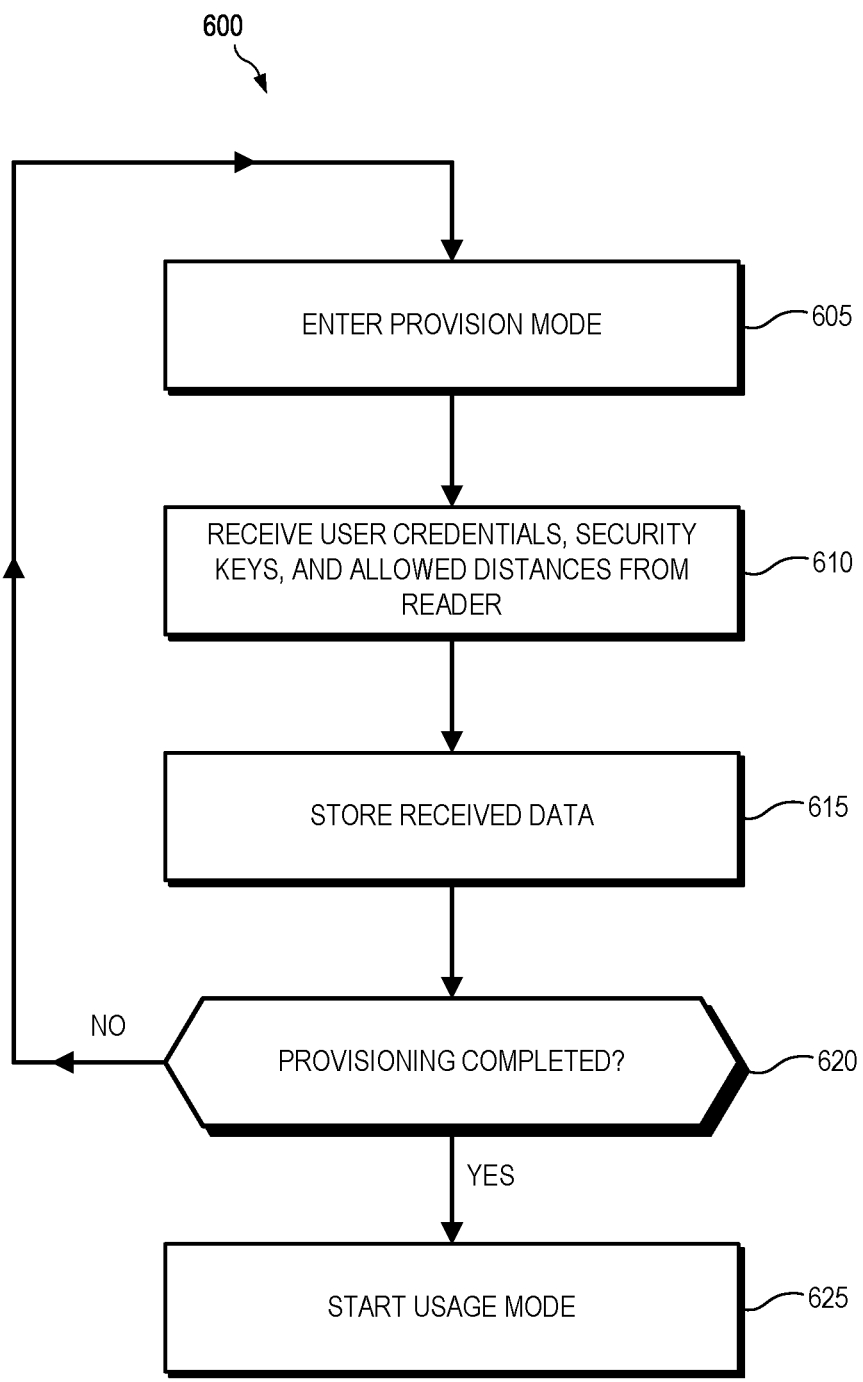
FIG. 6 is a flow diagram of an example method for provisioning a security tag, in accordance with some embodiments.

Referring now to FIG. 6, an example method 600 for provisioning a security tag is presented. At block 605 of example method 600, security tag 102 enters a provision mode. While in a provision mode, security tag 102 is configured to, for example, receive and store data used to configure security tag 102. To this end, at block 610, security tag 102 is configured to receive, from security reader 118, one or more user credentials 110, security keys 120, allowed distances 124, or any combination thereof. For example, while in a provision mode, communication circuitry 104 of security tag 102 is configured to transmit a provision request to one or more devices using one or more communication protocols (e.g., NFC, RFID, high-frequency RFID). The provision request, for example, includes data requesting one or more user credentials 110, security keys 120, allowed distances 124, or any combination thereof. In response to receiving the provision request, security reader 118 transmits the requested user credentials 110, security keys 120, and allowed distances 124 to security tag 102 using one or more communication protocols. At block 615, security tag 102 stores the received user credentials 110, security keys 120, and allowed distances 124 in storage 108. In embodiments, security tag 102 is configured to first decrypt, encrypt, or both one or more of the received user credentials 110, security keys 120, allowed distances 124, or any combination thereof using one or more of the received security keys 120 before storing the data in storage 108.

At block 620, security tag 102 determines whether provisioning of the security tag 102 has been completed. In response to determining that provisioning of the security tag 102 has been completed, the security tag 102 moves to block 625. In response to determining that provisioning of the security tag 102 has not been completed, the security tag 102 moves back to block 605. For example, in embodiments, security tag 102 determines whether a predetermined threshold number of user credentials 110, security keys 120, allowed distances 124, or any combination thereof has been stored in storage 108. In response to the number of user credentials 110, security keys 120, allowed distances 124, or any combination thereof being less than the predetermined threshold number, the security tag 102 determines that provisioning of the security tag 102 has not been completed and moves to block 605. In response to the number of user credentials 110, security keys 120, allowed distances 124, or any combination thereof being equal to or greater than the predetermined threshold number, the security tag 102 determines that provisioning of the security tag 102 has been completed and moves to block 620. At block 625, security tag 102 enters a usage mode. While in the usage mode, for example, security tag 102 is configured to poll for one or more ID tags 116.

Figure 7:
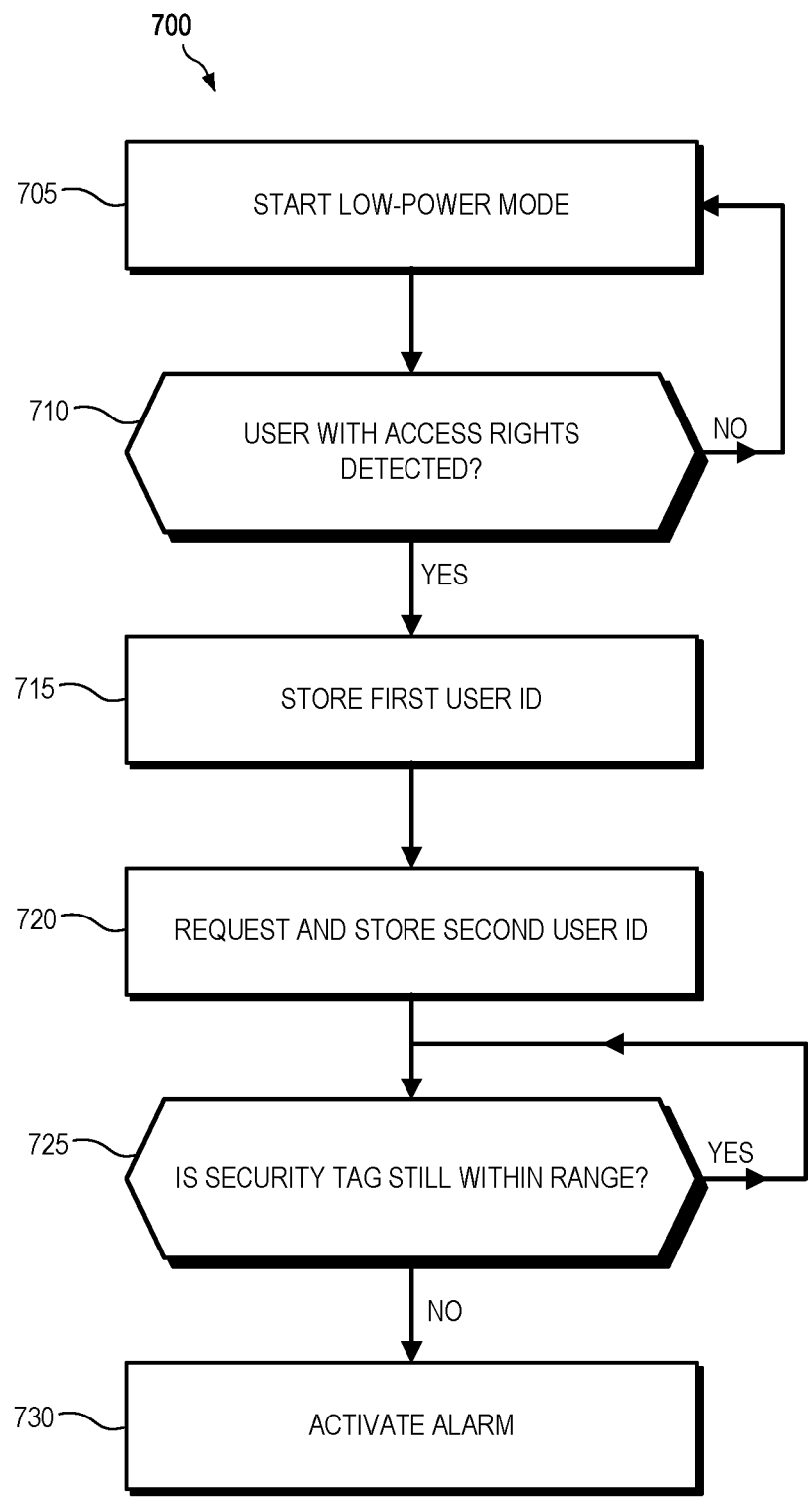
FIG. 7 is a flow diagram of an example method for determining a security tag is within a determined range, in accordance with some embodiments.

Referring now to FIG. 7, an example method 700 for determining a security tag is within a determined range is presented. At block 705 of example method 700, security tag 102 enters a low-power mode and polls for one or more ID tags 116. For example, while in a low-power mode, security tag 102, via communication circuitry 104, periodically sends out a request for one or more user IDs 122 to one or more ID tags 116 using one or more communication protocols. In response to receiving such a request, an ID tag 116 is configured to transmit an initial user ID 122 stored on the ID tag 116 to security tag 102 using one or more wireless communication protocols. At block 710, security tag 102 determines whether a user identified in a received initial user ID 122 has access rights to activate security tag 102. For example, security tag 102 first determines whether the user credentials 110 stored on security tag 102 include data associated with the user identified in the initial user ID 122. If the user credentials 110 do not include data associated with the user identified in the received user ID 122 (e.g., the user is unknown to security tag 102), security tag 102 moves back to block 705 and continues to poll ID tags 116. If the user credentials 110 do include data associated with the user identified in the initial user ID 122 (e.g., the user is known to security tag 102), security tag 102 then determines the access rights of the user indicated in the user credentials 110 to determine whether the user identified by the initial user ID 122 has access rights to activate security tag 102. In response to the user identified by the initial user ID 122 not having access rights to activate security tag 102, security tag 102 moves back to block 705 and continues to poll ID tags 116. In response to the user identified by the initial user ID 122 having access rights to activate security tag 102, security tag 102 moves to block 715. At block 715, security tag 102 is configured to store the initial user ID 122 in storage 108.

At block 720, security tag 102, via communication circuitry 104, is configured to request a user ID 122 from another ID tag 116 using one or more communication protocols. For example, security tag 102 is configured to request a user ID 122 from a second ID tag 116 within a functional range of communication circuitry 104. In response to receiving the request for a user ID 122, the second ID tag 116 transmits the user ID 122 stored on the second ID tag 116 to security tag 102 using one or more wireless communication protocols. Once the user ID 122 is received from the second ID tag 116, security tag 102 stores the user ID 122 in storage 108. According to some embodiments, at block 720, security tag 102 is configured to determine a range 126 based on one or more allowed distances 124 stored on security tag 102. For example, based on a stored allowed distance 124, security tag 102 determines a distance threshold (e.g., maximum distance) away from a predetermined point that represents a range 126. In embodiments, at block 720, security tag 102 is configured to determine a range 126 based on an allowed distance 124 associated with the user identified in the user ID 112 received from the second ID tag 116, a type of device of sensitive device 130 (e.g., smartphone, laptop computer, flash drive, hard drive, solid-state drive) to which the security tag 102 is affixed, or both.

At block 725, security tag 102 determines whether security tag 102 is within a range 126. As an example, displacement sensor 106 of security tag 102 tracks the distance 128 security tag 102 has moved away from a predetermined point (e.g., the center of a range 126). To track the distance 128, displacement sensor 106 first takes one or more measurements representing, for example, an acceleration of security tag 102, movement of security tag 102, position of security tag 102, or any combination thereof, to name a few. Security tag 102, displacement sensor 106, or both then determine a representation of the distance 128 security tage 102 has moved away from a predetermined point. The representation of the distance 128, for example, includes a value representation an approximation of the distance 128 security tage 102 has moved away from a predetermined point based on one or more measurements taken by displacement sensor 106. After the representation of distance 128 is determined, security tag 102 compares the representation of distance 128 to a predetermined threshold distance representative of range 126 (e.g., representative of a maximum distance away from a predetermined point). In response to security tag 102 determining that the representation of distance 128 is less than the predetermined threshold distance (e.g., determining that security tag 102 is still within range 126), security tag 102 continues to track the distance 128 security tag 102 has moved away from a predetermined point and repeats block 725. In response to security tag 102 determining that the representation of distance 128 is equal to or greater than the predetermined threshold distance (e.g., determining that security tag 102 is outside range 126), security tag 102 moves to block 730. At block 730, security tag 102 activates alarm 114. For example, security tag 102 activates an audio alarm, a visual alarm, a haptic alarm, or any combination thereof. As such, security tag 102 helps ensure a sensitive device 130 stays within a range 126 by activating alarm 114 once security tag 102 is affixed to the sensitive device 130 moves a threshold distance away from a predetermined point.

Figure 8:
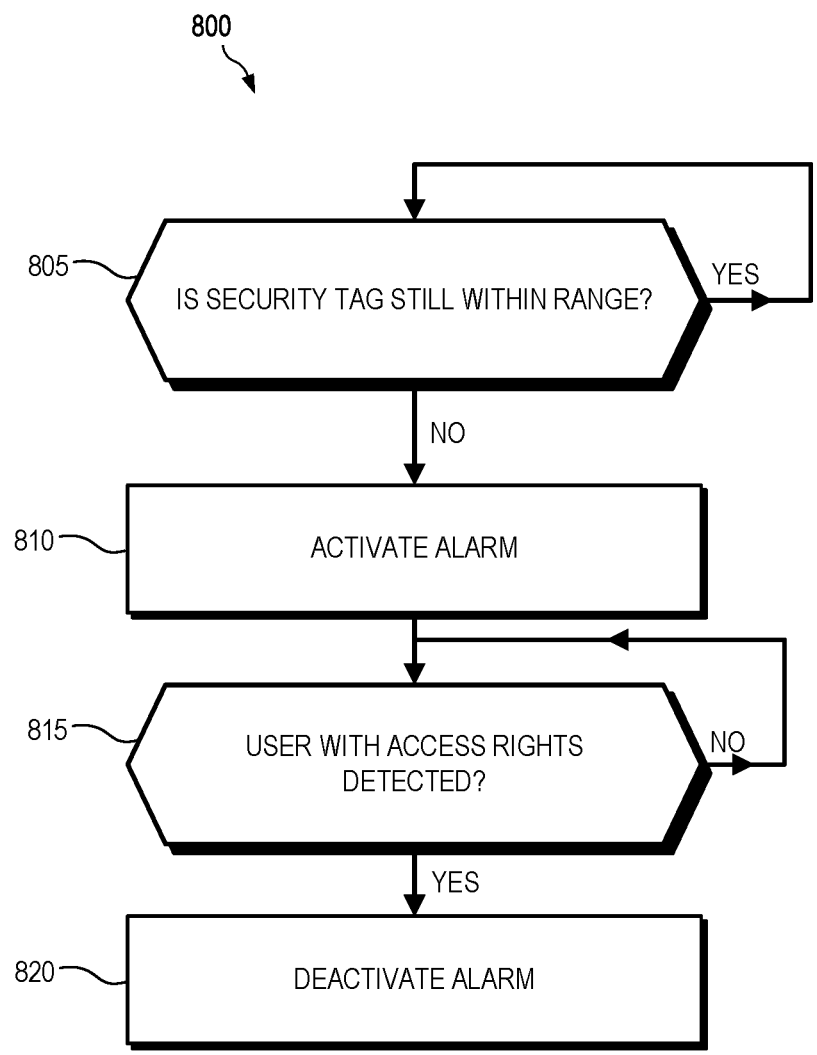
FIG. 8 is a flow diagram of an example method for deactivating the alarm of a security tag, in accordance with some embodiments.

Referring now to FIG. 8, an example method 800 for deactivating the alarm of a security tag is presented. At block 805 of example method 800, security tag 102 determines whether security tag 102 remains within a specified range (e.g., range 126). In response to security tag 102 still being within the range 126, security tag 102 continues to monitor whether security tag 102 is within the range 126. In response to security tag 102 being outside the range 126, security tag 102 activates alarm 114 (e.g., audio alarm, visual alarm, haptic alarm) at block 810. Also at block 810, when alarm 114 is active, security tag 102 is configured to receive a user ID 122 from an ID tag 116. At block 815, security tag 102 determines whether the user identified in the received user ID 122 has access rights to deactivate alarm 114. For example, security tag 102 first determines whether the user credentials 110 stored on security tag 102 include data associated with the user identified in the user ID 122 received from ID tag 116. If the user credentials 110 do not include data associated with the user identified in the received user ID 122 (e.g., the user is unknown to security tag 102), alarm 114 remains active and security tag 102 waits to receive another user ID 122. Security tag 102 then repeats block 815. If the user credentials 110 do include data associated with the user identified in the received user ID 122, security tag 102 determines the access rights of the user indicated in the user credentials 110 to determine whether the user identified by the initial user ID 122 has access rights to deactivate alarm 114. In response to the user identified by the initial user ID 122 not having access rights to deactivate alarm 114, alarm 114 remains active and security tag 102 waits to receive another user ID 122. Security tag 102 then repeats block 815. In response to the user identified by the initial user ID 122 having access rights to deactivate alarm 114, security tag 102 moves to block 820. At block 820, security tag 102 deactivates alarm 114. In this way, only authorized users are able to deactivate the alarm 114 of a security tag 102 once the security tag 102 has left a range 126, helping ensure security tag 102 remains within the range 126.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A security tag, comprising:
   wireless communication circuitry configured to receive a user identification (ID);
   a displacement sensor configured to, in response to the wireless communication circuitry receiving the user ID, determine whether the security tag is within a range from a predetermined point by determining, via an accelerator, a distance of the security tag from the predetermined point; and
   an alarm configured to activate in response to the security tag being outside the range from the predetermined point.

2. The security tag of claim 1, further comprising a secure element configured to encrypt, decrypt, and store data, wherein a distance threshold representative of the range is stored in the secure element.

3. The security tag of claim 1, wherein the alarm is further configured to deactivate in response to the wireless communication circuitry receiving a second user ID that is authorized to deactivate the alarm.

4. The security tag of claim 2, wherein the wireless communication circuitry is configured to receive the distance threshold from a reader via near-field communication (NFC).

5. The security tag of claim 1, wherein:
   the wireless communication circuitry is configured to receive user credentials, and
   the security tag includes a storage that is configured to store the user credentials.

6. The security tag of claim 5, wherein the wireless communication circuitry is configured to:
   receive an initial user ID from a first ID tag; and
   based on a comparison of the initial user ID to the user credentials, transmit a request for the user ID to a second ID tag different from the first ID tag.

7. The security tag of claim 6, wherein the storage is configured to store the initial user ID.

8. The security tag of claim 1, wherein the security tag is affixed to a housing of a device.

9. The security tag of claim 1, wherein the wireless communication circuitry is configured to receive the user ID using near field communication (NFC) protocols.

10. A security platform comprising:
    an identification (ID) tag configured to store a user ID; and
    a security tag configured to, in response to receiving the user ID from the ID tag, determine a representation of a distance of the security tag from a predetermined point.

11. The security platform of claim 10, wherein the security tag is configured to activate an alarm in response to the representation of the distance of the security tag from the predetermined point being equal to or exceeding a threshold.

12. The security platform of claim 11, wherein the security tag is configured to deactivate the alarm in response to receiving a second user ID that is authorized to deactivate the alarm from a second ID tag.

13. The security platform of claim 10, wherein the security tag is configured to receive the user ID using near field communication (NFC) communication protocols.

14. The security platform of claim 10, wherein the security tag is configured to:
   receive one or more user credentials; and
   store the received one or more user credentials.

15. The security platform of claim 14, wherein the security tag is configured to:
   receive an initial user ID; and
   based on a comparison of the initial user ID to the user credentials, transmit a request for the user ID to the ID tag.

16. The security platform of claim 15, wherein the security tag is configured to store the initial user ID.

17. The security platform of claim 10, wherein the security tag is affixed to a housing of a device.

18. A method, comprising:
   receiving, by a security tag, a user identification (ID) by one or more wireless communication protocols; and
   in response to receiving the user ID, determining, by the security tag, a representation of a distance of the security tag from a predetermined point.

19. The method of claim 18 further comprising activating, by the security tag, an alarm in response to the representation of the distance of the security tag from the predetermined point being equal to or exceeding a threshold.

20. The method of claim 19 further comprising deactivating the alarm in response to the security tag receiving a second user ID by the one or more wireless communication protocols from a second ID tag, wherein the second user ID is authorized to deactivate the alarm from a second ID tag.

* * * * *